(12) United States Patent
Kiselev et al.

(10) Patent No.: US 6,227,524 B1
(45) Date of Patent: May 8, 2001

(54) HIGH SPEED MASS TRANSFER TRAY

(75) Inventors: Victor Kiselev, ul. Metrostoiteley 32 kv. 105, Kharkiv (UA), 310183; Klaus Hartmann, Berlin (DE)

(73) Assignees: Gesip mbH, Berlin (DE); Victor Kiselev, Kharkiv (UA)

(*) Notice: Subject to any disclaimer, the term of this patent is extended or adjusted under 35 U.S.C. 154(b) by 0 days.

(21) Appl. No.: 09/337,228

(22) Filed: Jun. 22, 1999

(30) Foreign Application Priority Data

Jun. 22, 1998 (DE) .............................. 198 28 884

(51) Int. Cl.$^7$ ...................................... B01F 3/04
(52) U.S. Cl. .................. 261/79.2; 96/306; 261/114.1
(58) Field of Search .................. 261/79.2, 114.2, 261/114.3, 114.5; 96/306, 355; 202/158

(56) References Cited

U.S. PATENT DOCUMENTS

| | | | |
|---|---|---|---|
| 3,498,028 | * | 3/1970 | Trouw ................ 261/79.2 X |
| 3,605,388 | * | 9/1971 | Zuiderweg et al. ........... 261/79.2 X |
| 4,349,360 | * | 9/1982 | Schuurmans et al. ......... 261/79.2 X |
| 4,838,906 | * | 6/1989 | Kiselev ..................... 261/79.2 X |

FOREIGN PATENT DOCUMENTS

0281628 * 2/1991 (EP) .
345926    7/1972 (SU) .
475160    6/1975 (SU) .
575105 * 10/1977 (SU) ................................ 261/79.2

* cited by examiner

Primary Examiner—Richard L. Chiesa
(74) Attorney, Agent, or Firm—Tipton L. Randall

(57) ABSTRACT

The invention concerns a high-speed mass transfer tray with contact and separation elements (CSE) with each CSE consisting of an open, vertically aligned nozzle, which rests with its lower end on the tray and displays at least one row of annular holes, in which an axial swirler with two inclined vanes in the upper section and a firmly attached dense net of ribs arranged lengthwise along the nozzle axis at the lower section in the area of the annular holes is located. A cyclone separator located at the outlet end of the nozzle with deflection rings between separator and annular holes, characterized by the fact that the free cross-section of the CSEs for the gas flow measures 0.36 to 0.54 of the pipe cross-section after the swirler to ensure maximum performance of the gas and liquid flow and a high level of mass transfer efficiency, while each CSE between separator and annular holes features at least two deflection rings with a diameter either equal to or slightly larger than the outer diameter of the separator, with weir heights of about 50 to 300 mm above the lower annular holes. The high-speed mass transfer tray is used for processes to separate liquid-gas (vapor) mixtures and for the absorption, rectification, and desorption of mass mixtures, mainly in such fields as the gas, petroleum, petrochemicals, as well as the chemical industry.

8 Claims, 2 Drawing Sheets

HIGH SPEED MASS TRANSFER TRAY

CROSS REFERENCE TO RELATED APPLICATION

This application claims benefit under 35 U.S.C. 119(a)–(d) of co-pending German patent application No. DE 198 28 884, filed Jun. 22, 1998. German patent application No. DE 198 28 884 is hereby incorporated by reference.

FIELD OF THE INVENTION

The invention concerns a high-speed mass transfer tray utilized in processes to separate liquid-gas (steam) mixtures and for the absorption, rectification, and desorption of mixtures, mainly in such fields as the gas, petroleum, petrochemical, and chemical industry, as well as environmental protection and power technology. The primary range of applications is to be found in processes relating to the treatment of natural gas and processing of hydrocarbons at medium and high pressures on offshore platforms located on continental shelves and on the onshore (mainland).

BACKGROUND OF THE INVENTION

Certain proposed mass transfer tray constructions are equipped with contact and separation elements (CSE) featuring a firmly attached axial swirler at the inlet end and a cyclone separator at the outlet end (Inventor's Certificate USSR, No. 345926, Class B01D 3/20). The supply of the liquid into the contact zone is realized by two rows of annular holes. One is located in the area of the inclined vanes of the axial swirler, and the other is below the swirler. The disadvantage of this type of tray lies in the low level of effectiveness of mass transfer due to undesirable (parasitic) flows in two directions. The first undesirable flow occurs in the free space between the column shell and the CSE, with some part of the liquid flowing from the tray plate directly to the weir without having mass transfer contact with the gas phase. The second undesired flow concerns the backflow of liquid that has already finished the mass transfer process and is now flowing back from the separator to the annular holes, which are intended for supplying liquid for contact with the gas entering the CSE.

Furthermore, a swirler contact element is known (CSE) (inventor's certificate USSR No. 475160, Class B01D 3/30), containing a nozzle with a row of annular holes at its input end and a hollow cyclone separator at its output end. An axial swirler is firmly attached in the perforation zone and contains several inclined vanes. The nozzle features an annular rib at its outer side between the swirler and the separator.

Contrary to the CSE described above, this type of construction allows for a significant increase of the technical-economic performance parameters of the tray. The known CSEs, however, limit the intensity of the mass transfer and, thus, also the effectiveness of the tray.

Another highly effective swirler contact element is known (CSE) (U.S. Pat. No. 4,838,906, U.S. Class 55/238 and European Patent No. 0281628 B1). It contains a short nozzle with a row of annular holes at its input end and a complex axial swirler inside. The firmly attached axial swirler of this CSE has inclined vanes in the upper section and a dense net of short vertical vanes arranged lengthwise to the nozzle axis in the lower section, with the number of straight vanes being at least twice the number of inclined vanes. This cyclone separator may be operated in one or two stages.

Such a construction allows a significant increase of the effectiveness of the mass exchange and the separation of the phases within one single element. However, the mere arrangement of a series of CSEs on a tray does not guarantee the desired high level of mass transfer intensity. Due to the undesired (parasitic) flows on the tray past the CSEs and to the backflow from the separator exit via one deflection ring along the outer wall of the CSE to the annular holes to be once more in contact with the gas, the actual new liquid flow leaves the tray without establishing contact.

Experience collected during practical applications of the CSE in industry shows that not only is an optimal choice of the CSE dimensions and shape a necessity, but also required is an improved organization of the flow of liquids on a tray equipped with CSEs. Here it should be noted that no intensive mixing of the fluid through the gas bubbles occurs on CSE trays, which stands in contrast to bubble cap trays where an intensive thorough mixing of the liquids is performed while they flow from one side of the tray to the other.

SUMMARY OF THE INVENTION

The object of the invention is to design a high-speed tray with CSEs in such a way as to achieve a highly effective mass and heat transfer at high gas velocities by equipping the tray with specially constructed CSEs and tray elements, according to the F factors of 3.5 to 10.5

$$\frac{m}{s}\sqrt{\frac{kg}{m^3}}$$

relating to the full cross-section of the tray void with a tray distance of 400 to 600 mm.

The object of the invention finds its solution in the following layout. The mass transfer tray with CSE, the most important element, which consists of an open vertical nozzle resting with its lower end on the tray, and having at least one row of annular holes in the nozzle. A firmly attached axial swirler, with inclined vanes in its upper section and a dense net of short vertical vanes in its lower section arranged lengthwise in the area of the annular holes, is positioned within the vertical nozzle. A cyclone separator is located at the end of the nozzle with deflection rings between the separator and the annular holes. The tray is distinguished by the free cross-section of the CSE for the gas flow, amounting to 0.36 to 0.54 of the pipe cross-section after the swirler, while guaranteeing a maximum performance regarding the gas and liquid throughput and a high level of effectiveness for the mass transfer. In this case, each CSE, between the separator and the perforations, has at least two deflection rings whose diameter is equal to or slightly larger than the outer diameter of the separator, with the weir located at a height of 50 to 300 mm above the lower annular holes.

Such a constructive design of a high-speed contact tray with CSE guarantees a high level of effectiveness for mass transfer at high loads concerning the liquid and gas throughputs due to the larger free cross-section of the CSEs in the swirler zone, and the enlarged phase transfer area. A high level of effectiveness for mass transfer is also due to a preceding atomization of the liquid, which enters the contact element at high speeds, as well as due to the larger height of the liquid weir located above the lower row of annular holes.

In addition, the two deflection rings attached to the outer wall of the nozzle a defined distance from one another, between the cyclone separator and the annular holes, represent a reliable block for undesired backflow to the CSEs of the liquid already used during the mass transfer process.

The outer diameter of the deflection rings has to be at least as large as the diameter of the output end of the cyclone separator. However, in borderline cases, the ring diameter may equal the distance t between the two neighboring CSEs, as long as these components are distributed evenly across the entire tray.

It serves the functionality of the tray to arrange the upper deflection ring in such a way as to locate it below the upper edge of the spillover weir. The lower deflection ring should be distanced from the upper deflection ring by 0.2 to 1.0 times the inner diameter $D_i$ of the CSE.

Such a constructive design improves the barrier effect. The fresh liquid flow moves in the lower layer on the tray and enters the CSEs through the annular holes. After the mass transfer, the liquid separated in the cyclone separator essentially flows across the tray to the spillover weir as the upper flow layer and then discharges onto the tray below. This type of guidance permits maintaining a high mass transfer level on the tray.

Furthermore, it is also practical to attach vertical barrier baffles, especially on both sides of the liquid input and output sides, which eliminate undesired (parasitic) flows between the column body and the CSEs.

Such a constructive solution ensures the fresh liquid needed for the necessary mass transfer flows into the CSEs, and thus increases the overall effectiveness of mass transfer on the tray.

For optimal performance, it is also important to arrange such a layout of the CSEs on the mass transfer tray to guarantee a free cross-section of all CSEs, with an inner diameter of the nozzle $D_i$, that is in the range from 23 to 36% of the tray area.

This constructive solution guarantees maximum liquid and gas loads for the tray as a whole and, thus, for the entire mass transfer apparatus equipped with such trays.

BRIEF DESCRIPTION OF THE DRAWINGS

FIG. 1 depicts the liquid flows with continuous arrows and the gas flows with dotted lines.

DESCRIPTION OF THE PREFERRED EMBODIMENTS

| Nomenclature | |
|---|---|
| 1 | Tray |
| 2 | Support beam |
| 3 | Support tray ring |
| 4 | Interior wall |
| 5 | Column shell |
| 6 | Opening of the tray plate |
| 7 | Contact and separation element |
| 8 | Cylindrical vertical nozzle |
| 9 | Annular holes |
| 10 | Axial swirler |
| 11 | Inclined vanes |
| 12 | Vertical vanes |
| 13 | Cyclone separator |
| 14 | Input end of nozzle |
| 15 | Nozzle edge |
| 16 | Ring slot |
| 17 | Deflection ring |

| -continued | |
|---|---|
| Nomenclature | |
| 18 | Separation zone |
| 19 | Outer wall |
| 20 | Deflection ring |
| 21 | Downcomer segment |
| 22 | Downcomer channel |
| 23 | Weir |
| 24 | Adjustable weir segment |
| 25 | Upper edge of weir segment |
| 26 | Downcomer channel |
| 27 | Beveled inner edge |
| 28 | Clearance/gap |
| 29 | Vertical protective baffle |

Construction

Figure 1:
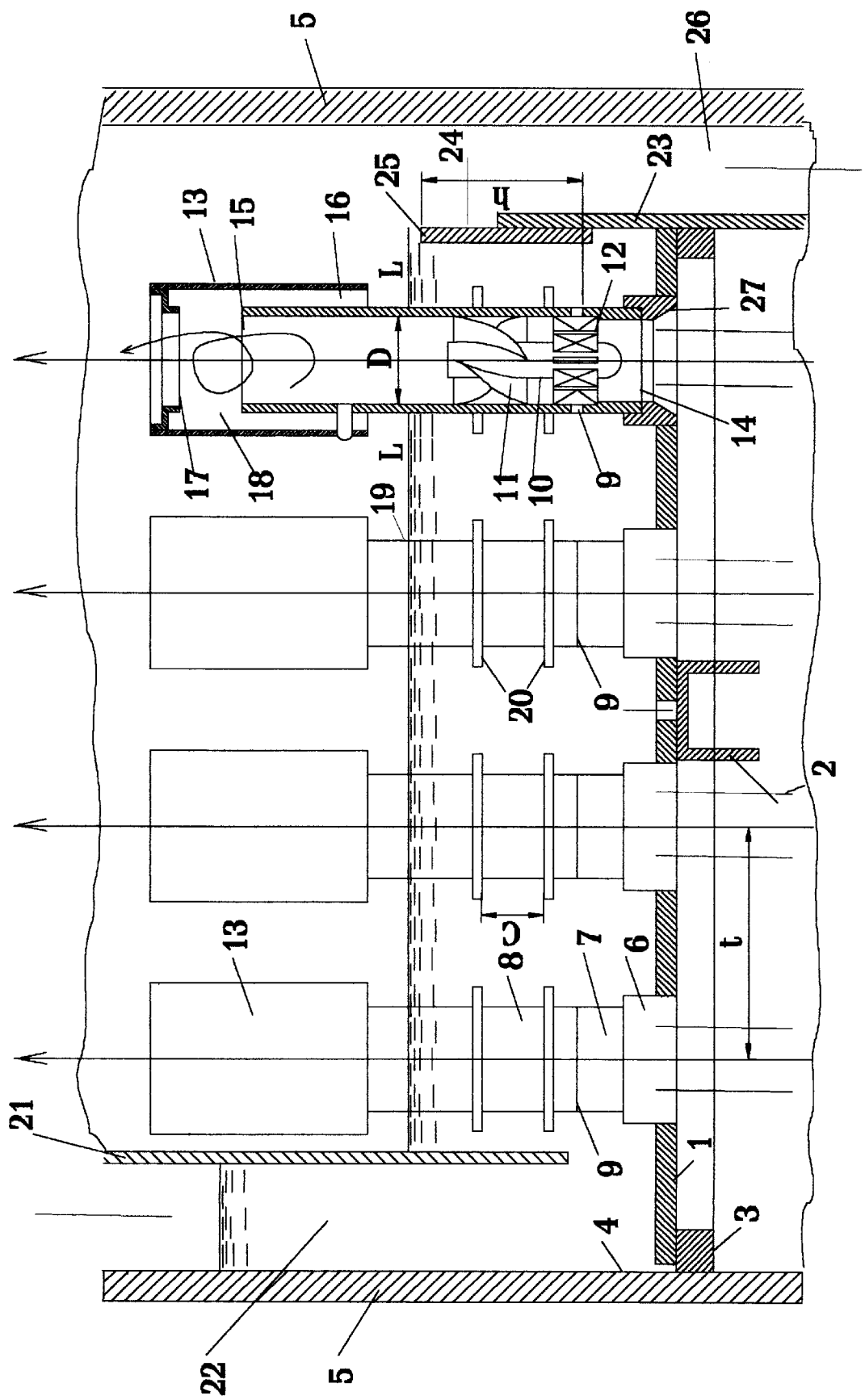
FIG. 1 is a longitudinal sectional view schematic of a high-speed mass transfer tray with CSE as part of the mass transfer column according to the invention.

Referring to FIG. 1, the high-speed mass transfer tray with CSE elements consists of the tray plate 1, which rests on support beam 2 and support tray ring 3, and is attached on the interior wall 4 of the column shell 5 of the mass transfer column. The contact and separation elements 7 (CSEs) are fixed into the openings 6 of the tray plate using special clamps. The CSE element 7 consists of a cylindrical vertical nozzle 8 with at least one row of annular holes 9 in its lower section. The axial swirler 10 is firmly attached to the inside of the nozzle 8, and has inclined vanes 11 in the upper section, and a dense net of ribs with level vertical vanes 12 arranged at the lower section in the area of the annular holes 9. The inlet end 14 of nozzle 8 rests on tray plate 1. The cyclone separator 13, with the concentric annular ring slot 16 to exhaust the liquid and deflection rings 17 to exhausts the gas flow, is located at the outlet opening of the separator. The separation zone 18 is located between the nozzle 15 and the ring 17. The deflection rings 20, with a clearance of 0.2 to 1.0 $D_i$, are installed on the outside wall 19 of the nozzle 8, where $D_i$ denotes the inner diameter of the nozzle.

The tray located above the tray of FIG. 1 has a downcorner plate 21, which, together with column shell 5, forms a downcorner channel 22 for the liquid. The Liquid drainage weir 23 has a vertically adjustable weir plate 24, its upper edge 25 is elevated above the annular row of holes by about 50 to 300 mm, resulting in the liquid level LL being above the deflection rings 20. Segment 23 and the column shell 5 make up a downcorner 26 to drain the liquid after the mass transfer process has taken place. The outer diameter of the deflection rings 20 is either equal to the diameter of the separator 13 or larger, the maximum diameter being the value t, which is the distance between two neighboring separator elements. Opening 6 has a beveled inner edge 27 for gas input.

Figure 2:
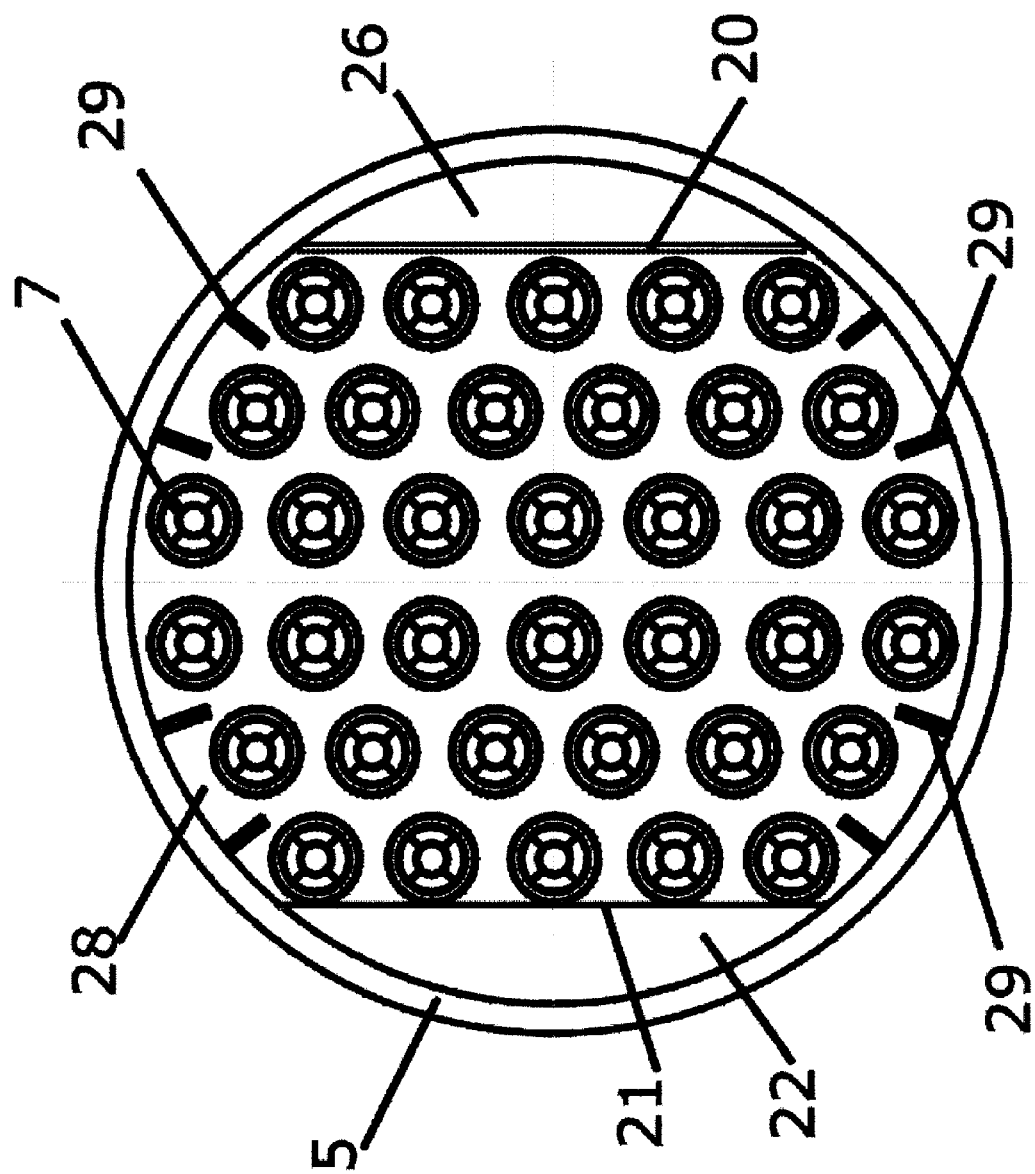
FIG. 2 is a cross-section of a mass transfer column according to the invention, with a top view of a high-speed tray with CSE and deflection rings, with the rings corresponding to the outer diameter of the cyclone separator.

The arrangement of the CSEs on the tray is shown in FIG. 2. The gap 28 between the column shell 5 and the nozzle of the CSE 7 is screened off by vertical, protective baffles 29.

The high-speed mass transfer tray's mode of operation is as follows. The gas streams in the axial direction from the bottom to the top and enters all CSE elements simultaneously as illustrated by the arrows in FIG. 1. The liquid enters through the annular row of holes 9 into the grid net of vertical vanes 12 that are arranged along the swirler axis, thus dispersing the liquid into small droplets. To maintain a continuous flow of liquid through annular holes 9, a constant level of liquid LL has to be present on the tray plate. This is effected through segment 24 of the overflow weir on the tray plate 1. Together with the gas in the CSE, the liquid drops move in an axial direction towards the top until the two phases reach the area where the inclined vanes 11 of axial swirler 10 are located. Passing through this zone, the liquid-gas flow is subject to a rotary motion, which causes some of the drops to be flung on the inside of nozzle 6. This creates a rotating liquid film, which moves upward due to the frictional forces of the gas flow. The final separation of liquid drops and liquid film from the gas flow takes place in separation zone 18. The separated and turbulized gas exits the separator 13 via the deflection rings 17, which prevents entrainment of the liquid. The separated liquid flows through the concentric annular ring slot 16 to be added to the liquid on tray plate 1, which is at level LL. The fresh liquid from the next higher tray enters via the channel 22 and flows onto tray plate 1 as the bottom-most layer, and then seeps into the inside of the CSE element through annular holes 9, where the gas-mass transfer takes place. The deflection rings 20 covered by the liquid and located within a distance of C=0.2 to 1.0 $D_i$ ($D_i$=inner diameter of nozzle) prevent undesired backflows of liquid, which has already been subjected to the mass transfer process. This liquid flows to the drainage weir 25 as the upper layer and then reaches the tray below via downcorner channel 26. The vertical protective baffles 29 prevent undesired flows between the downcorner channel 22 to downcorner channel 26 via the gap 28 between the interior wall of column shell 5 and CSEs 7. The protective baffles 29 located on both sides of the fluid input and output ends (a total of 4, although 8 are preferred) ensure that only fresh liquid enters the mass transfer process with the gas flow.

The high level of the edge 25 of the downcorner weir 23, amounting to a height of 50 to 300 mm above the annular holes 9, as well as the high flow velocities of the vanes of the axial swirler 10, guarantee an intensive atomization of the liquid and, thus, a high intensity level of the mass transfer and the phase separation in the turbulently swirled flow.

The deflection rings 20, which are immersed into the liquid located on the tray and are arranged in a distance of C=0.2 to 1.0 $D_i$ from one another, effectively prevent undesired circulatory flows in the environment of the CSEs by serving as a double shield for the annular holes 9 against the liquid already subjected to the mass transfer process and now exiting the separator 13.

The design and development of high-speed trays equipped with contact and separation elements according to the invention permit the construction of highly compact, miniaturized mass separation facilities with a high level of productivity and performance capability. These mass transfer trays may be used in new separation facilities, as well as when debottlenecking and modernizing existing facilities to increase efficiency and performance.

The invention at hand permits the creation of high-speed mass transfer trays for compact, miniaturized separation facilities with a high level of productivity and performance capability, which may be utilized in a variety of industries. Such applications encompass the natural gas industry, where the invention finds its place in the treatment and processing of gases under medium and high pressures. These applications include dehydration with glycol, amine washes to clean gas, as well for the absorption, desorption, and rectification of hydrocarbon mixtures to separate crude oil, methanol, amines, or gas condensates from gases. This invention may be utilized in the chemical industry for a variety of processes in combination with other mass transfer equipment for gas-liquid systems. Power plants can use the invention for the condensation of water vapor and the separation of water drops from high-pressure steam, respectively.

The primary area of application for the present invention is its use in onshore (land-based) facilities for natural gas production and off-shore platforms on continental shelves, especially those located in arctic regions, where low weight, small sizes, and high specific production are of special importance.

While the invention has been particularly shown and described with reference to preferred embodiments thereof, it will be understood by those skilled in the art that various changes in form and details may be made therein without departing from the spirit and scope of the invention.

What is claimed is:

1. A contact tray assembly for positioning in a liquid-gas mass transfer column apparatus comprising;
    (a) a horizontal tray member supported within the column apparatus, said tray member containing a plurality of openings therein,
    (b) a contact and separation element (CSE) positioned in each tray opening, each CSE element comprising
        (i) an open, vertical, cylindrically shaped nozzle, which rests with a lower edge on said tray plate, said nozzle having at least one row of annular holes at a lower end;
        (ii) an axial swirler firmly attached inside said nozzle, said swirler having inclined vanes in an upper section and a dense net of short, vertical vanes arranged lengthwise to said swirler axis and located adjacent said annular holes in said nozzle lower end,
        (iii) a hollow cyclone separator at an upper output end of said nozzle with an interior deflection ring opposite said nozzle output end;
        (iv) at least two deflection rings fastened exterior and concentric to said cylindrical nozzle, said rings having diameters at least as large as said cyclone separator outer diameter;
    (c) weir means secured to said tray member for maintaining a liquid level on said tray member about 50 to 300 mm above said nozzle lower annular holes; and
    (d) inlet means for delivering liquid to said tray assembly from above;
    (e) whereby a maximum capacity correlates with the gas-liquid flow rates, and a high mass transfer efficiency is ensured where the free cross-section of the CSEs for the gas throughput is in the range from 0.36 to 0.54 of the cross-section of the nozzle inlet opening.

2. A contact tray assembly according to claim 1, wherein the nozzle upper deflection ring is located below an upper edge of said weir means, and the nozzle lower deflection ring is located within a distance of 0.3 to 1.0 of the inner diameter of the CSE nozzle member, relative to said upper deflection ring.

3. A contact tray assembly according to claim 1, further comprising a plurality of at least four vertical barrier baffles secured to said tray member and to said column adjacent said liquid inlet means and said liquid level maintaining weir means to prevent undesired parasitic flows between the column shell and the CSEs.

4. A contact tray assembly according to claim 1, wherein said plurality of CSEs have a combined bulk cross-section relating to the inner diameter of the nozzle $D_i$ in the range of 23 and 36% of the cross-section of the tray.

5. A contact tray assembly for positioning in a liquid-gas mass transfer column apparatus comprising;
    (a) a horizontal tray member supported within the column apparatus, said tray member containing a plurality of openings therein;

(b) a contact and separation element (CSE) positioned in each tray opening, each CSE element comprising
  (i) an open, vertical, cylindrically shaped nozzle, which rests with a lower edge on said tray plate, said nozzle having at least one row of annular holes at a lower end;
  (ii) an axial swirler firmly attached inside said nozzle, said swirler having inclined vanes in an upper section and a dense net of short, vertical vanes arranged lengthwise to said swirler axis and located adjacent said annular holes in said nozzle lower end;
  (iii) a hollow cyclone separator at an upper output end of said nozzle with an interior deflection ring opposite said nozzle output end;
  (iv) two deflection rings fastened exterior and concentric to said cylindrical nozzle, said rings having diameters at least as large as said cyclone separator outer diameter, with an upper deflection ring located below a liquid level on said tray member, and a lower deflection ring located within a distance of 0.3 to 1.0 of the inner diameter of the CSE nozzle member, relative to said upper deflection ring;
(c) weir means secured to said tray member for maintaining a liquid level on said tray member about 50 to 300 mm above said nozzle lower annular holes; and
(d) inlet means for delivering liquid to said tray assembly from above;
(e) whereby a maximum capacity correlates with the gas-liquid flow rates, and a high mass transfer efficiency is ensured where the free cross-section of the CSEs for the gas throughput is in the range from 0.36 to 0.54 of the cross-section of the nozzle inlet opening.

6. A contact tray assembly according to claim 5, further comprising a plurality of at least four vertical barrier baffles secured to said tray member and to said column adjacent said liquid inlet means and said liquid level maintaining weir means to prevent undesired parasitic flows between the column shell and the CSEs.

7. A contact tray assembly for positioning in a liquid-gas mass transfer column apparatus comprising;
(a) a horizontal tray member supported within the column apparatus, said tray member containing a plurality of openings therein;
(b) a contact and separation element (CSE) positioned in each tray opening, each CSE element comprising
  (i) an open, vertical, cylindrically shaped nozzle, which rests with a lower edge on said tray plate, said nozzle having at least one row of annular holes at a lower end;
  (ii) an axial swirler firmly attached inside said nozzle, said swirler having inclined vanes in an upper section and a dense net of short, vertical vanes arranged lengthwise to said swirler axis and located adjacent said annular holes in said nozzle lower end;
  (iii) a hollow cyclone separator at an upper output end of said nozzle with an interior deflection ring opposite said nozzle output end;
  (iv) two deflection rings fastened exterior and concentric to said cylindrical nozzle, said rings having diameters at least as large as said cyclone separator outer diameter, with an upper deflection ring located below a liquid level on said tray member, and a lower deflection ring located within a distance of 0.3 to 1.0 of the inner diameter of the CSE nozzle member, relative to said upper deflection ring;
(c) weir means secured to said tray member for maintaining a liquid level on said tray member about 50 to 300 mm above said nozzle lower annular holes;
(d) inlet means for delivering liquid to said tray assembly from above; and
(e) a plurality of at least four vertical barrier baffles secured to said tray member and to said column adjacent said liquid inlet means and said liquid level maintaining weir means to prevent undesired parasitic flows between the column shell and the CSEs;
(f) whereby a maximum capacity correlates with the gas-liquid flow rates, and a high mass transfer efficiency is ensured where the free cross-section of the CSEs for the gas throughput is in the range from 0.36 to 0.54 of the cross-section of the nozzle inlet opening.

8. A contact tray assembly according to claim 7, wherein said plurality of CSEs have a combined bulk cross-section relating to the inner diameter of the nozzle $D_i$ in the range of 23 and 36% of the cross-section of the tray.

\* \* \* \* \*